Sept. 19, 1939.   L. F. WILKINSON   2,173,406
TREE MOVING DEVICE
Filed Aug. 16, 1937   2 Sheets-Sheet 1
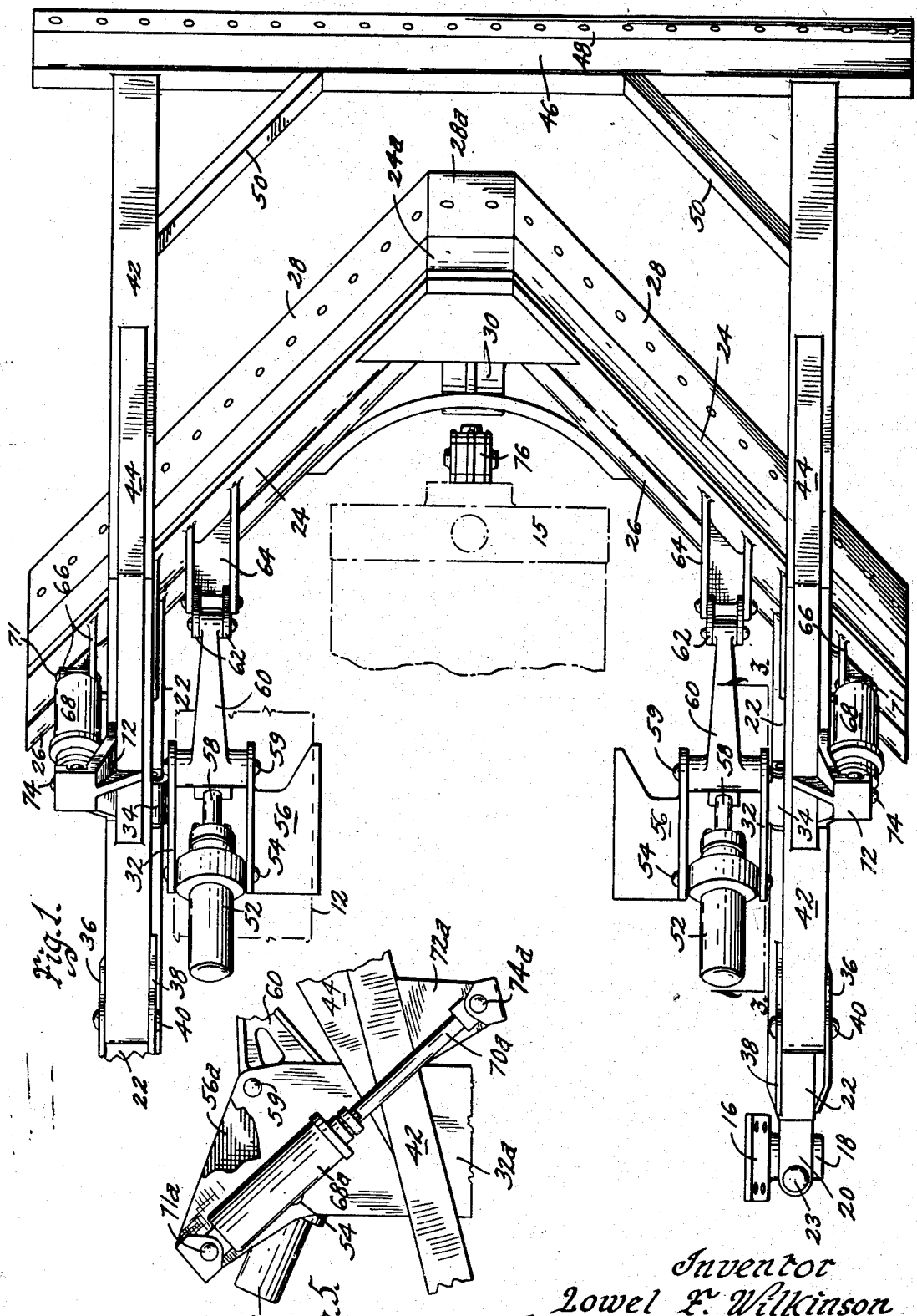
Inventor
Lowel F. Wilkinson
by Bair & Freeman
Attorneys Sept. 19, 1939.  L. F. WILKINSON  2,173,406
TREE MOVING DEVICE
Filed Aug. 16, 1937  2 Sheets-Sheet 2
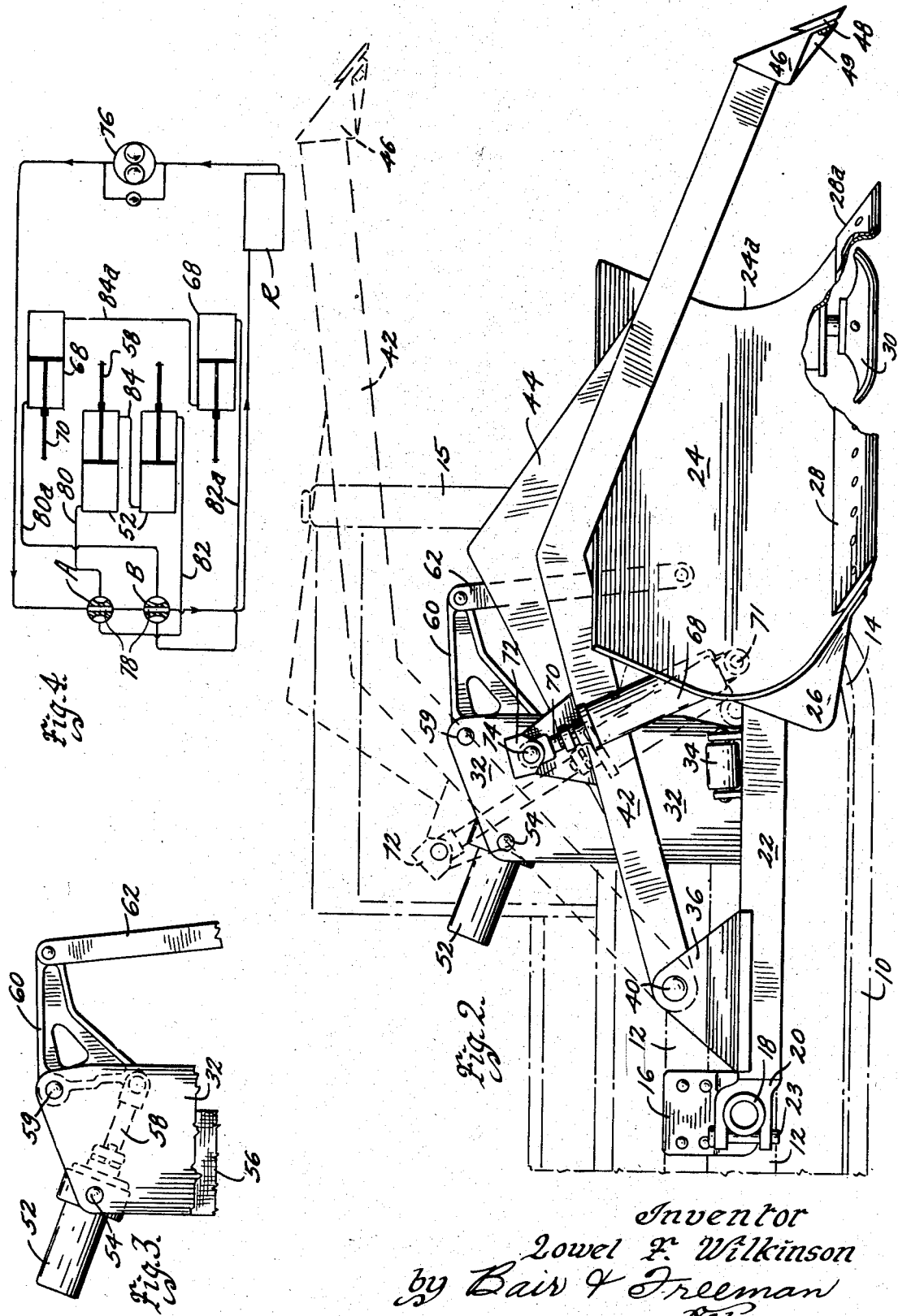
Inventor
Lowel F. Wilkinson
by Bair & Freeman
Attorneys

UNITED STATES PATENT OFFICE 2,173,406

TREE MOVING DEVICE

Lowel F. Wilkinson, Harlingen, Tex., assignor to La Plante-Choate Manufacturing Co., Inc., Cedar Rapids, Iowa, a corporation of Delaware Application August 16, 1937, Serial No. 159,358

10 Claims. (Cl. 37—2)

One object of my invention is to provide an earth moving device particularly adapted for uprooting trees and bushes from the earth, the device being readily attachable to a tractor or the like for propulsion thereby and being comparatively simple to construct.

Another object is to provide an attachment for a tractor which includes a lower bulldozer-like blade for engaging roots and pulling them out of the ground and an upper bumper bar which might be termed a treedozer and which is adaptable for engaging a tree for pushing it over and thereby extracting the portions of its roots adjacent the base of the tree from the ground so that they can be engaged by the bulldozer blade and either cut off or pulled from the ground by the bulldozer blade.

Another object is to mount the tree bumper bar so that it is carried by the frame of the bulldozer blade and thereby the entire apparatus is unitary in character to facilitate attachment and detachment of the unit relative to a tractor.

Still a further object is to provide a simple mechanism for adjusting the height of the bulldozer or root engaging blade relative to the ground over which the tractor travels and to also adjust the treedozer so that it can selectively engage the trunk of a tree either adjacent its base at any desired point spaced thereabove and within the limits of its adjustment, thus making the device adaptable for uprooting bushes or trees of different sizes.

With these and other objects in view, my invention consists in the construction, arrangement and combination of the various parts of my earth moving device, whereby the objects contemplated are attained, as hereinafter more fully set forth, pointed out in my claims, and illustrated in the accompanying drawings, in which:

Figure 1 is a plan view of my apparatus illustrating its relation to the front end of a tractor on which a pump is mounted for supplying oil under pressure to hydraulic jacks which are included as a part of the apparatus.

Figure 2 is a side view of the apparatus showing the forward end of the tractor in dot and dash lines.

Figure 3 is a view on the line 3—3 of Figure 1 showing a side elevation of part of one of the jack structures.

Figure 4 is a diagrammatic view showing an oil pump and control valves for the hydraulic jacks for adjusting the bulldozer blade and the treedozer blade; and Figure 5 is a partial side elevation showing a modified construction.

On the accompanying drawings, I have used the reference numeral 10 to indicate a track of a track laying type of tractor. One of the track frames thereof is indicated at 12 and one of the forward sprockets of the track is indicated at 14. The radiator of the tractor is shown at 15.

A bracket 16 is provided for each side of the tractor. The brackets 16 are permanently attached to the side frames 12, there being one bracket for each side of the tractor and one of them being omitted from Figure 1. The brackets 16 are provided with tubular studs 18 on which are pivoted bearing jaws 20. These jaws are fastened as by welding to the rear ends of arms 22. Jaw pins 23 normally retain the jaws 20 in position but permit ready removal of the side arms 22 from the tractor when desired. This is particularly for the purpose of permitting the present device to be quickly detached from the tractor and permit other devices such as snow plows, road builders and the like to be substituted in place thereof.

Secured to the forward ends of the side arms 22 is a bulldozer blade 24. This blade comprises preferably, a pair of blade elements arranged to form a V as shown in Figure 1 and a third blade element 24a spanning the front ends so that the V-shaped blade is thus provided with a blunt-nose. The blades 24 are provided with reinforcements 26 to which the forward ends of the side or push arms 22 are welded.

Detachable hardened cutting blades 28 and 28a are secured to the forward edges of the blades 24 and 24a. A shoe 30 is preferably provided, just back of the blade 28a, for the purpose of preventing undesirable gouging of the blades 28 and 28a into the ground.

Bracket plates 32 are secured to the track frames 12 and extend upwardly therefrom. The arms 22 are provided with rollers 34 to bear thereagainst for the purpose of permitting the bulldozer blade 24 to be raised and lowered during operation as required, yet undesirable lateral strains are eliminated or counter-acted by the rollers 34 bearing against the plates 32.

Bracket plates 36 and 38 are welded to the arms 22 and extend upwardly therefrom. These support pivot pins 40 and treedozer push arms 42. The arms 42 are bent to form an obtuse angle as illustrated in Figure 2 so that they may extend up over the bulldozer blade 24 yet have their front ends terminate adjacent the ground. Reinforcing webs 44 are provided for preventing any undesired bending of these arms during operation.

A pusher bar 46 of triangular cross section is welded to the forward ends of the arms 42 and extends laterally of the tractor. The bar 46 may be provided with a detachable blade 48 preferably of hardened metal so that it can withstand considerable wear during use. The bar 46 is reinforced against bowing by diagonal brace members 50. During operation, it is desirable to adjust the height of the bulldozer blade 24. I provide for accomplishing this by using a pair of hydraulic jack structures to raise and lower the blade relative to the tractor as desired. The jacks are indicated at 52. They are pivotally mounted by pivot pins 54 on the bracket plates 32 and companion bracket plates 56. The bracket plates 56 are also secured to the track frames 12 of the tractor as indicated in Figure 1.

Each hydraulic jack 52 has a piston rod 58 pivoted at its lower ends as shown in Figure 3 to a bell crank arm 60. The bell crank arm is pivoted on a pin 59 supported by the bracket plates 52 and 56. Link connections 62 are provided between each bell crank arm and a bracket 64 extending from the back of the blade 24. Obviously the blade may be raised by supplying oil pressure to the rear ends of the jacks 52 or lowered by supplying oil to the front ends thereof as will hereinafter be described in connection with the description of Figure 4. It is also desirable to adjust the height of the treedozer blade 46. This blade may be nonadjustable if desired but is preferably adjustable by being pivoted at 40 and moved by hydraulic jacks 68. The jacks 68 have their lower ends pivoted at 71 to brackets 66 on the back of the bulldozer blade 24 and piston rods 70 extend from their upper ends. The piston rods 70 are pivoted by pins 74 to brackets 72. The brackets 72 are welded to the treedozer push arms 42. As shown by dotted lines in Figure 2, the jacks 68 may be extended for raising the treedozer blade.

I have just described the preferred form of mechanism for adjusting the treedozer blade relative to the bulldozer blade. With such mechanism, the two blades are adjusted simultaneously by the jacks 52. Additional adjustment for the treedozer blade relative to the bulldozer blade is secured by adjusting the jacks 68. During actual operations, the bulldozer blade need not be raised more than 18 or 20 inches above the ground and should be capable of lowering as much as 6 or 8 inches below the ground to take care of unevenness of the contour of the ground over which the tractor travels. Ordinarily the best position for the blade 28 is closely adjacent the ground surface.

An alternative arrangement for adjusting the elevation of the treedozer blade is shown in Figure 5, in which some parts are similar to those already described. These parts accordingly bear the same reference numeral with the addition of "a". The bracket plates 32a and 56a are extended to provide a support for the pivot pin 71a. The hydraulic jack 68a has its piston rod 70a pivoted at 74a to a bracket 72a. The bracket 72a extends downwardly to a push arm 42 instead of upwardly therefrom. The hydraulic jack 68a thereby serves as an adjustable connection between the tractor and the push arm 42 instead of between the push arms 22 and 42 as in Figure 2.

Referring to Figure 4, the hydraulic system is shown. A pump for oil or the like is illustrated at 76. This pump as shown in Figure 1 is mounted on the forward end of the tractor and is driven from the motor thereof in a conventional manner. Control valves A and B are provided and there is a reservoir R for the oil. The control valves A and B are of the four way type, having control passageways 78 for by-passing the oil when the valves are turned to their off position as shown. The valve A is connected by conduits 80 and 82 to the jacks 52. The forward end of one jack is connected to the rearward end of the other jack by a conduit 84. This arrangement insures synchronous movement of the jacks so that both sides of the bulldozer 24 will be raised or lowered simultaneously without twisting of the frame.

Similarly the control valve B is connected by conduits 80a and 82a to the jacks 68, a conduit 84a being provided to connect the two jacks together in series. The valves A and B can be turned a quarter turn in either direction for securing either extension or contraction of the jacks 52 and 68 to the degree desired, whereupon return of the valve to the position illustrated, locks the jacks in their new position.

My present device is particularly adapted for removing trees and brush such as mesquite and the like including their roots from the ground. It is well recognized in clearing brush land, that the value of the land is directly proportional to the amount of brush that can be removed and stay removed. Hence it is desirable to push the trees and brush over so as to at least partially expose their roots and then to engage and pull the roots out of the ground preparatory to burning them. This is readily accomplished by my device in which the pusher bar or treedozer blade 46 may be readily raised or lowered to meet the requirements of brush and trees of different heights. As the tractor advances, the trees and brush are pushed over and partially uprooted due to the bumper bar 46 being above and forwardly of the bulldozer blade 24. After being so pushed and partially uprooted, the blades 28 and 28a engage the roots and in most instances remove them completely from the ground as the blades bite into them. Thus the tractor is able to pull them out of the ground while at the same time, the bumper bar 46, by pushing the trees and brush over, aids in the root extracting operation. In actual practice, I have found that as much as 25 acres of brush land per day can be cleared by a machine of the character disclosed.

The blade 28a provides greater clearance for the bumper bar 46 and also eliminates the cutting edges 28 coming to a sharp point. The angularity of the blades 24 effectively casts the roots and trees aside as the tractor advances whereupon they may be readily piled for burning.

Some changes may be made in the arrangement and construction of the various parts of my earth moving machine, without departing from the real spirit and purpose of my invention, and it is my intention to cover by my claims, any modified forms of structure or use of mechanical equivalents, which may be reasonably included within their scope.

I claim as my invention:

1. In a tractor attachment of the character described, a root engaging member, means for mounting said root engaging member on a tractor or the like, a tree engaging member, means for mounting said tree engaging member on said tractor in a position above said root engaging member and means for adjusting the height of said tree engaging member relative to said root engaging member while the root and tree engaging members are in operation.

2. In combination, a bulldozer blade, means for mounting said bulldozer blade on a tractor or the like, means for adjusting the elevation thereof relative to the ground over which said tractor travels, a tree engaging member, means for mounting said tree engaging member on said tractor in position above said bulldozer blade and means for adjusting the height of said tree engaging member relative to said bulldozer blade.

3. In a device of the class described, a pair of arms having their rear ends connected to a tractor or the like, a bulldozer blade carried by the forward ends of said arms, a second pair of arms having their rear ends connected to said first arms, a treedozer element mounted on the forward ends of said second arms, said second arms extending over said bulldozer blade and said treedozer element being positioned ahead of said bulldozer blade.

4. In a device of the class described, a pair of arms having their rear ends connected to a tractor or the like, a bulldozer blade carried by the forward ends of said arms, a second pair of arms having their rear ends pivotally connected to said first arms, means for relatively adjusting said first and second arms and a treedozer element mounted on the forward ends of said second arms.

5. In combination with a bulldozer mounted on a tractor or the like, a pair of arms having their rear ends pivotally connected to said bulldozer, means for adjusting said arms relative to said bulldozer and a treedozer element mounted on the forward ends of said arms and ahead of said bulldozer.

6. In a device of the class described, a pair of arms having their rear ends connected to a tractor or the like, a bulldozer blade carried by the forward ends of said arms, a second pair of arms having their rear ends pivotally connected to said first arms, means for relatively adjusting said first and second arms and a treedozer element mounted on the forward ends of said second arms, the means for relatively adjusting said arms comprising hydraulic jack connections between the arms.

7. In a device of the class described, a pair of arms having their rear ends connected to a tractor or the like, a bulldozer blade carried by the forward ends of said arms, a second pair of arms having their rear ends pivotally connected to said first arms, means for adjusting said second arms relative to said bulldozer blade and a treedozer element mounted on the forward ends of said second arms, the means for relatively adjusting said arms comprising brackets mounted on said tractor and hydraulic jack connections between said brackets and said second arms.

8. In a device for uprooting trees and the like, an element for engaging and pushing trees over, means for mounting said element on a tractor for propulsion thereby, and a root engaging element carried by the tractor and operable to engage the roots of a tree after they are partially extracted from the ground by said first element engaging and pushing the tree over and means for relatively adjusting said elements while the device is in operation.

9. In a device for uprooting trees and the like, an element for engaging and pushing trees over, means for mounting said element on a tractor for propulsion thereby, and a root engaging element carried by the tractor and operable to engage the roots of a tree after they are partially extracted from the ground by said first element engaging and pushing the tree over, said first element being variable in elevation relative to said root engaging member during operation of said device to engage the tree adjacent the ground or at selected points spaced thereabove.

10. In a device for uprooting trees and the like, an element for engaging and pushing trees over, means for mounting said element on a tractor for propulsion thereby, and a root engaging element carried by the tractor and operable to engage the roots of a tree after they are partially extracted from the ground by said first element engaging and pushing the tree over, said root engaging member comprising a V-shaped bulldozer blade having a blunt nose for engaging the roots at right angles to the line of travel of the tractor and angularly arranged wings extending backwardly and rearwardly from said blunt nose.

LOWEL F. WILKINSON.